UNITED STATES PATENT OFFICE.

JOHN HENRY LANGE, OF NEW YORK, N. Y.

COMPOUND FOR PRODUCING COLOR ON WALL-PAPER, CLOTH, &c.

SPECIFICATION forming part of Letters Patent No. 343,378, dated June 8, 1886.

Application filed April 21, 1886. Serial No. 199,677. (Specimens.)

*To all whom it may concern:*

Be it known that I, JOHN HENRY LANGE, a citizen of the United States, and a resident of New York city, New York, have invented a new and useful Compound for Producing Color on Wall-Paper, Cloth, &c.; and I hereby declare that the following is a full, clear, and exact description of the same.

My invention consists in the combination of certain substances in the manner hereinafter explained, whereby a composition is formed which, when applied to the surface of wall-paper, cloth, or other fabric or material, produces a style of coloring of a rich and varied metallic character heretofore unknown, and at less expense than metallic coloring has hitherto entailed, and which, moreover, when used on fabric, produces a metallic ground on which designs and patterns can be printed as readily as on a water-color ground.

Hitherto metallic coloring on paper and similar fabric has been produced by combining powdered bronze or brocade with some gummy material and then applying this composition to the surface to be colored. In this old process the color and the general effect and appearance of the surface were caused by the bronze, and by that alone. To produce any satisfactory results large quantities of bronze had to be used, which made the product, when finished, expensive.

My composition may be made as follows: I take fourteen pounds of bronze and add to this gradually six pounds of gum-starch, and mix these together thoroughly. Then I add thirty-three pounds of pulp color and mix the whole together again thoroughly, and reduce the resulting mixture down to the consistency desired by using warm water. The required proportions of these different substances vary somewhat with the shade of color desired. The compound is then in a condition to be applied to the surface it is designed to color, and it is so applied in any of the well-known ways. It produces a metallic-colored surface of richer and finer appearance and of much greater variety and delicacy of shade than anything hitherto known or produced in this class of colors.

The use of pulp-color enables me to avail myself of the very great variety of shades in which that substance is made, and when the different shades of pulp-color are combined with the different shades of bronze a practically unlimited variety of color grounds can be produced.

A pound of my composition will do the same amount of coloring as a pound of the old mixture of gum and bronze, and is less expensive than the old mixture, as pulp-color is cheaper than bronze.

In producing the lighter-colored metallic grounds I find I can still further reduce the amount of bronze required by adding to the composition already described another element—namely, talc—and as talc is a comparatively cheap material, the expense of these lighter-colored metallic grounds is thus still further reduced. In the latter composition the talc has the effect of giving a sheen to the surface, and as the bronze has therefore only to produce a metallic appearance, and is not relied upon so exclusively to produce the sheen, less bronze is required and the expense consequently reduced.

When talc is used my composition may be made as follows: I take ten pounds of talc and mix with this a sufficient quantity of what is known in the trade as "gum-starch," or any translucent adhesive substance, to make the resulting mixture of the consistency of printer's color. To this I add fourteen pounds of bronze or brocade, the shade of bronze depending upon the particular color or shade of surface desired. Then I add to the above twenty-eight pounds of water and two pounds of liquid starch or gum. The various ingredients must then be thoroughly stirred and mixed together. After this fifty pounds of pulp-color are added, the shade or nature of the color depending upon the color of surface desired. The whole should then be again thoroughly mixed and combined.

In the old metallic-colored surfaces the entire coloring was produced by the bronze, which fact limited the range of shades attainable and made the process and product expensive. By my invention I am enabled to substitute pulp-color—a cheaper material—for a large fraction of the bronze, and in addition secure a practically unlimited variety of shades as the direct result of the combination of the pulp-color with the bronze.

My color surface, when produced on fabric, can be printed upon as easily as the ordinary water-color ground.

I prefer the proportions above stated; but as the essence of my invention lies in the combination of bronze and coloring-matter, with or without talc, the combination of these two substances in any proportions, either with or without talc, by means of which the results above set forth are substantially obtained, would come within the scope of my invention. In like manner chemical equivalents may be employed without departing from my invention.

What I claim as new, and desire to secure by Letters Patent, is—

1. A composition of matter for producing color, consisting of gum-starch or any equivalent translucent adhesive substance, bronze, pulp-color, and water, substantially as and for the purposes set forth.

2. A composition of matter for producing color, consisting of gum-starch or any equivalent translucent adhesive substance, bronze, talc, pulp-color, and water, substantially as and for the purposes set forth.

JOHN HENRY LANGE.

Witnesses:
EDWIN SEGER,
ROBERT N. KENYON.